Dec. 4, 1951   J. MAGNUSSON   2,577,341
CONTAINER HANDLING AND REGISTERING APPARATUS
Filed March 19, 1949   4 Sheets-Sheet 1

INVENTOR
JOSEPH MAGNUSSON
BY J. Stanley Churchill
ATTORNEY

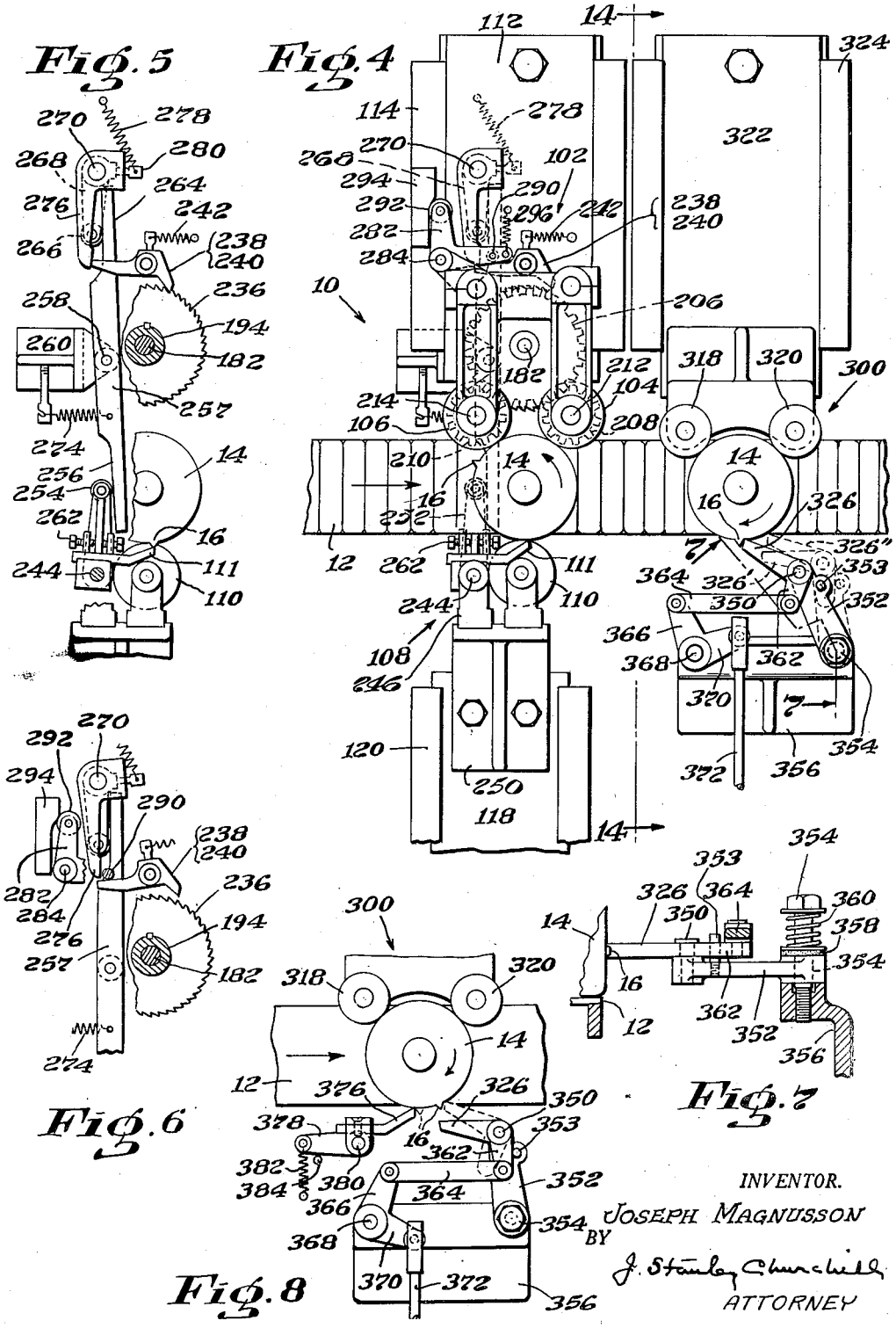

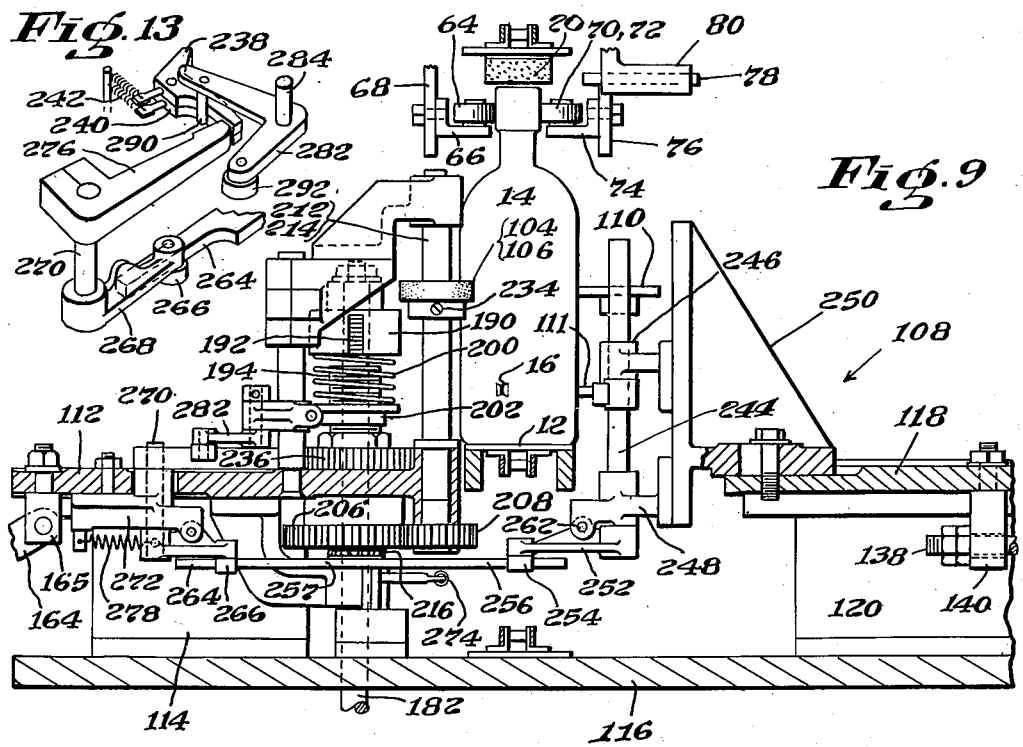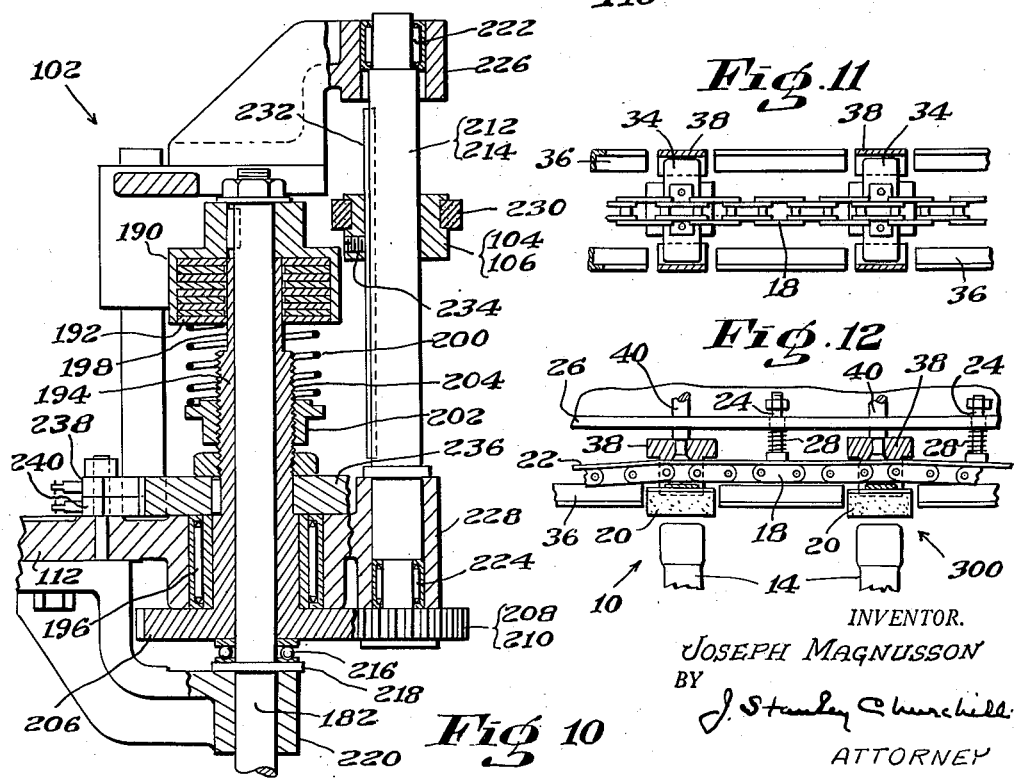

Dec. 4, 1951  J. MAGNUSSON  2,577,341
CONTAINER HANDLING AND REGISTERING APPARATUS
Filed March 19, 1949  4 Sheets-Sheet 4
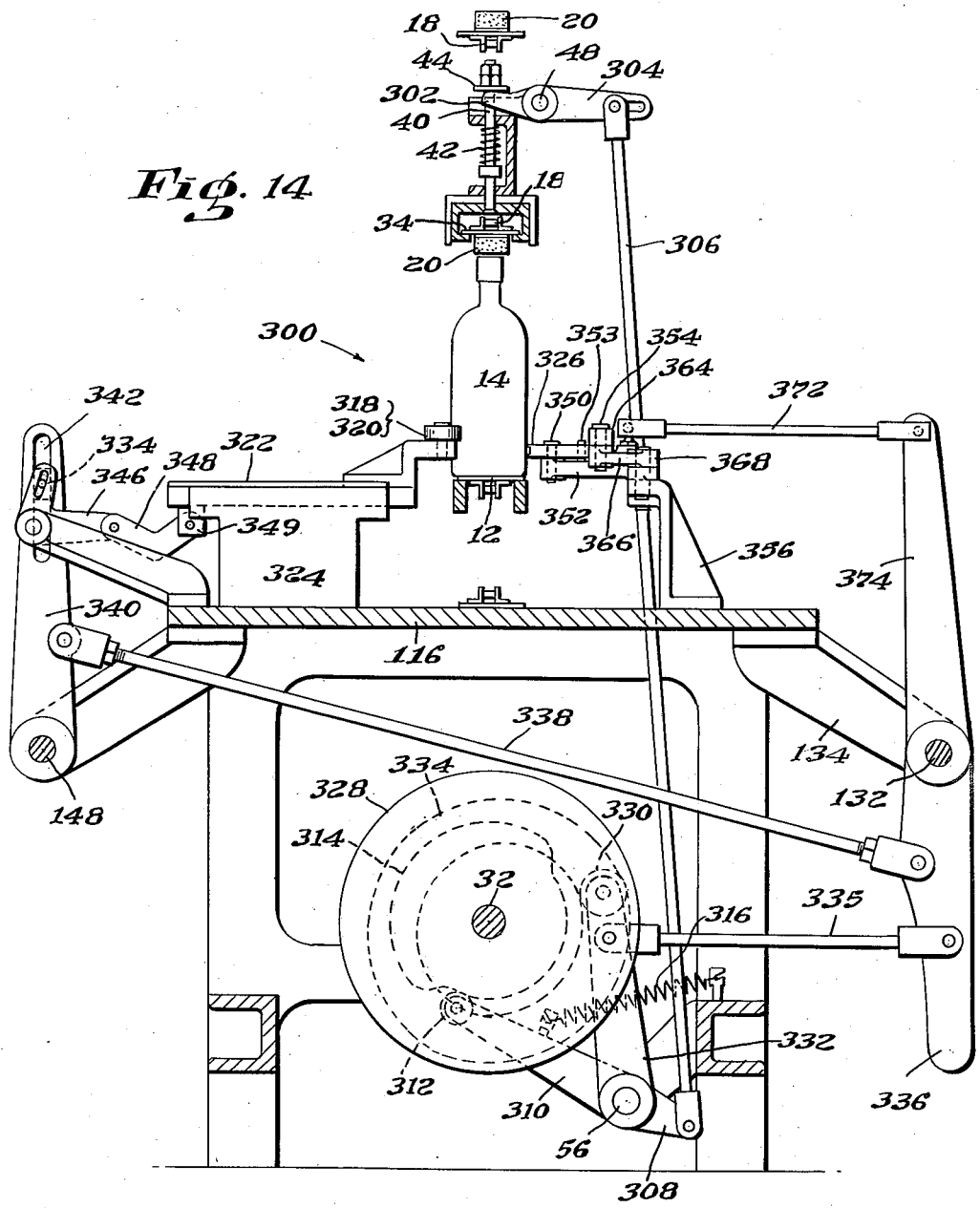
INVENTOR
JOSEPH MAGNUSSON
BY J. Stanley Churchill
ATTORNEY Patented Dec. 4, 1951

2,577,341

UNITED STATES PATENT OFFICE 2,577,341

CONTAINER HANDLING AND REGISTERING APPARATUS

Joseph Magnusson, Wollaston, Mass., assignor to Pneumatic Scale Corporation, Limited, Quincy, Mass., a corporation of Massachusetts Application March 19, 1949, Serial No. 82,303

20 Claims. (Cl. 198—33)

This invention relates to container handling and registering apparatus.

The invention has for an object to provide a novel and improved apparatus for handling containers, such as bottles, of the type having letters or characters formed in the body portion thereof, such as raised letters or characters molded in the glass of bottles, and for registering the containers with respect to the conveying portion of the apparatus, to the end that subsequent operations, such as the labeling of the bottle or container, may be accomplished with the application of the label to the predetermined desired portions of the body of the bottle or container. The invention contemplates an improvement in the container handling and registering apparatus illustrated and described in my United States Patent No. 2,293,553 issued August 18, 1942 and is characterized by the provision of an additional station of operation for more positively and accurately registering the containers in a predetermined position relative to the conveyer in a novel and highly efficient manner.

With this general object in view and such others as may hereinafter appear, the invention consists in the container handling and registering apparatus and in the various structures, arrangements and combinations of parts hereinafter described and particularly defined in the claims at the end of this specification.

Figure 1:
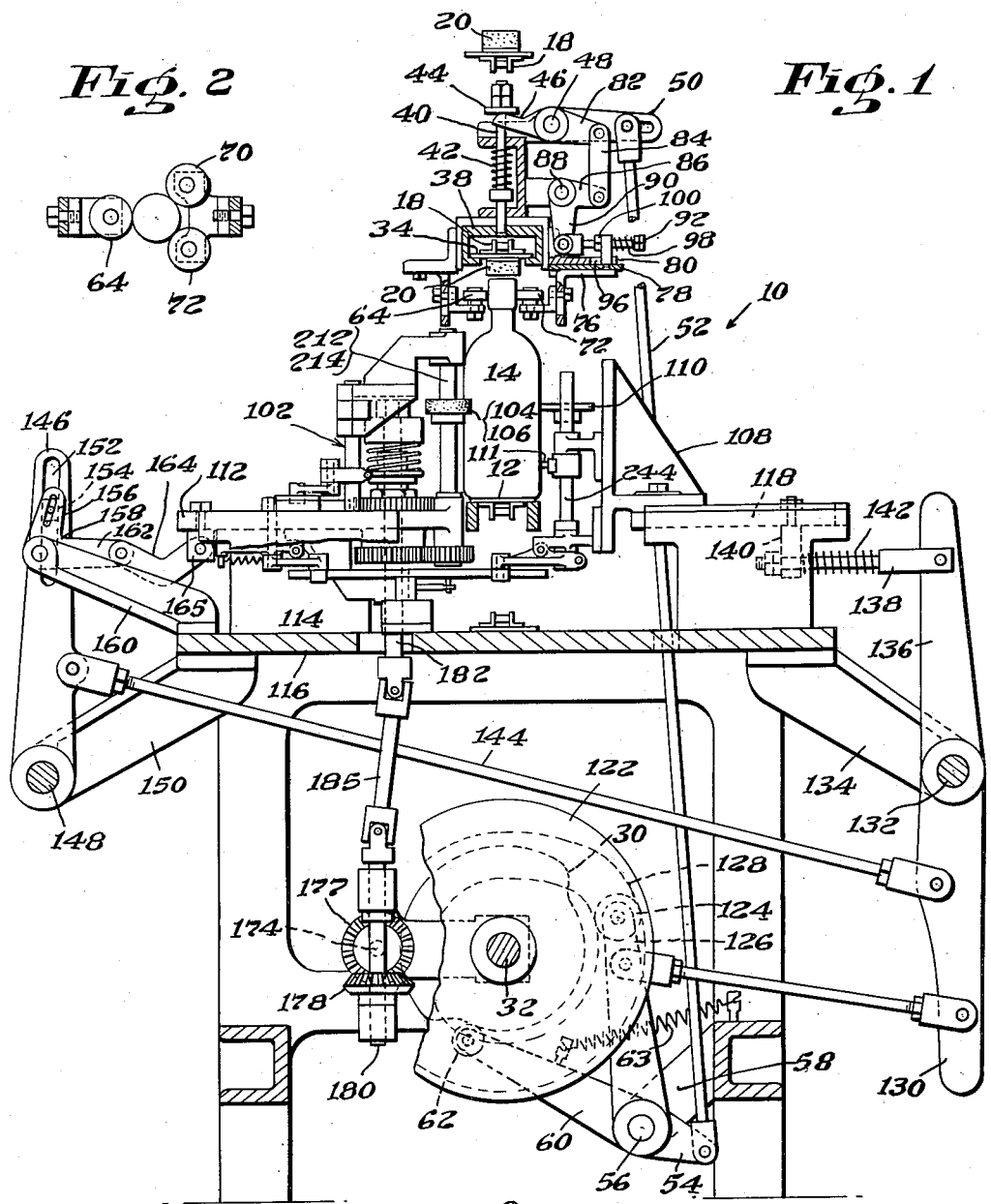
Figure 2:
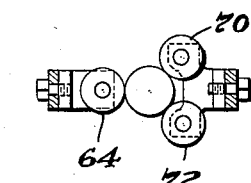
Figure 3:
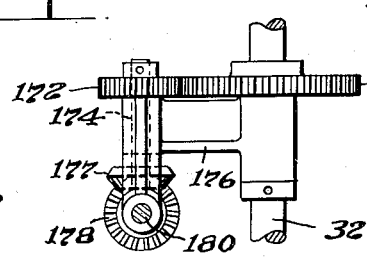

In the drawings illustrating the preferred embodiment of the invention, Fig. 1 is an end view, partly in cross-section, of a sufficient portion of a labeling machine embodying the present invention to enable it to be understood; Fig. 2 is a plan view detail of mechanism for supporting and aligning the upper portion of the container; Fig. 3 is a plan view detail of a portion of the driving mechanism shown in Fig. 1; Fig. 4 is a plan view of the present registering apparatus showing the two registering stations; Figs. 5 and 6 are detail plan views of portions of the registering apparatus at one station of operation shown in Fig. 4 and illustrating the mechanism in different positions of operation; Fig. 7 is a detail view of a portion of the second station of operation of the apparatus as viewed from the line 7—7 of Fig. 4; Fig. 8 is a plan view detail of a modified form of the second station of operation of the apparatus; Fig. 9 is a side elevation, partly in cross-section of one station of the registering apparatus shown in Fig. 4; Fig. 10 is an enlarged cross-sectional view of a portion of the driving mechanism forming part of the registering apparatus shown in Fig. 9; Figs. 11 and 12 are detail views in plan and side elevations respectively of the upper supporting belt, to be referred to; Fig. 13 is a perspective view of resetting mechanism, to be referred to; and Fig. 14 is an end view, similar to Fig. 1, and illustrating the second station of the registering apparatus, as viewed from the line 14—14 of Fig. 4.

In general, the invention contemplates handling and registering apparatus in which provision is made for conveying a series of containers which for convenience of description will be hereinafter referred to as bottles, and for registering successive bottles in predetermined relation to the conveyer so that when the line of bottles is conveyed to subsequent instrumentalities, such as labeling mechanism, the application of the label may be effected at predetermined portions of the body of the bottle. The invention, in its preferred form, is designed for operation upon bottles of substantially cylindrical shape having raised letters or characters formed on the body thereof, and contemplates mechanism for cooperating with successive bottles as they are being conveyed for detecting the raised lettering or other characters on the body of the bottle and for registering such portion of the bottle in definite position with respect to the conveyer, so that as the bottles are conveyed to subsequent instrumentalities, additional operations, such as labeling operations may be effected upon desired predetermined portions of the body of the bottle. To this end, in the preferred embodiment of the invention, the apparatus is provided with feeling mechanism disposed at one station of operation designed to detect a raised portion of a bottle and also with mechanism for rotating the bottle until such feeling mechanism indicates that the raised portion of the bottle has assumed a preliminary position relative to the conveyer approximating the predetermined position desired and preferably with the raised portion moved to an angular position slightly beyond the desired predetermined position in the direction of rotation of the bottle whereupon provision is made for discontinuing the rotation of the bottle with relation to the conveyer. Thereafter, the bottle is moved into operative position with relation to a succeeding station of operation wherein provision is made, in accordance with the present invention, for accurately positioning the bottle to the desired position relative to the conveyer by engagement of the raised portion and rotation of the bottle through a relatively small arc in an opposite direction and for positively stopping rotation of the bottle when the desired position is reached.

While the prior container handling and registering apparatus shown in the Magnusson patent referred to is operative to successfully position the bottles with relation to the conveyer within satisfactory commercial limits in most instances, it was found in practice that a variation in the height of the raised portions or any imperfections in the periphery of the bottles would cause variations in the position of termination of rotation of the bottles so that it was difficult to maintain uniform registration of successive bottles. Also, the relatively high speed of operation of the machine renders it difficult to effect instantaneous termination of rotation of the bottle when a raised portion is detected so that the bottle would rotate a short distance beyond the predetermined position desired in varying amounts with the result that imperfect registration was obtained.

In accordance with the present invention, the bottle is first rotated, at one station of operation, until it assumes the approximate position desired, the rotation being purposely terminated at a point to dispose the raised portion slightly beyond the desired position. Thereafter at a second station of operation, the bottle is accurately positioned by mechanism designed to engage the raised portion and to rotate the bottle in a reverse direction to a fixed angular position relative to the conveyer thus assuring uniform disposition of successive bottles relative to the conveyer and proper registration with the labeling mechanism. In practice, the angular disposition of the raised portion beyond the predetermined desired position, at the first station of operation, may vary within reasonable limits, the second station of the registering apparatus being adapted to engage the raised portions in such varying positions and to accurately position successive containers uniformly relative to the conveyer.

Referring now to the drawings, and particularly to Figs. 1 and 4, the registering apparatus, indicated generally at 10 and 300, is herein illustrated as embodied in a labeling machine which may be of any usual or preferred type, and which may include a movable support such as a belt 12 adapted to be intermittently moved to present the bottles 14 to successive stations for applying a label and for pressing the label against the bottle. The bottle 14 herein illustrated, is provided with a raised portion 16 which may be either a projection formed on the surface thereof or may be part of lettering molded in the bottle.

In the operation of the commercial labeling machine, the bottles 14 are fed from a source of supply onto the belt 12, without reference to the position of the lettering thereon with relation to the supporting belt 12. The bottles are preferably placed upon the intermittently movable conveyer belt 12 in predetermined spaced relation for registration with the labeling mechanisms.

In accordance with the present invention, the bottles are successively moved into operative position with relation to stations 10 and 300 of the registering apparatus prior to being presented to the subsequent mechanisms for applying the label whereby the container may be rotated on its vertical axis at station 10 until it assumes a position approximating the desired position relative to the conveyer, whereupon the bottle is moved to station 300 wherein provision is made for accurately positioning the bottle in definite relation to the conveyer so that when the containers are subsequently presented to the labeling mechanisms, they will be properly positioned with relation thereto to apply the labels in the desired location on the bottles.

Provision is also made, in the commercial labeling machines now upon the market, for supporting the top of the bottles as they are conveyed through the machine and, as herein shown, such support is effected by an endless chain 18 having a plurality of pads 20 adapted to yieldingly engage the top of the bottles and to be moved along with the bottles at the same rate of speed as the belt 12. The chain 18 is arranged to be pressed downwardly by a flexible steel strip 22 supported upon pins 24 mounted to be capable of vertical movement in a frame member 26 of the labeling machine. The strip 22 is urged into engagement with the top of the lower run of the chain 18 by springs 28 as clearly shown in Figs. 11 and 12. In order to free the bottle 14 from such pressure to permit rotation thereof, as will be described, provision is made for raising the pad 20 from engagement with its bottle and, as illustrated in Fig. 1, raising of the pad at station 10 is effected through connections from a cam 30 fast upon a cam shaft 32 forming part of the labeling machine. As shown in Figs. 1, 11, 12, each pad 20 is mounted on a transverse member 34 which is guided between stationary angle rails 36. The rails 36 are open at station 10 of the bottle registering mechanism and a movable member 38 is normally disposed to form an extension of the rails 36. An elongated stud 40 connected to the movable member 38 and vertically movable in the frame member 26 is normally urged downwardly by a spring 42. The upper end of the stud is provided with a washer 44 arranged to be engaged by one arm 46 of a lever pivotally mounted on a stud 48 secured in the machine frame. A second arm 50 of the lever is connected by a link 52 to one arm 54 of a cam lever rockingly mounted on a stud 56 secured in a bracket 58 attached to the machine frame. The second arm 60 of the cam lever is provided with a roller 62 which cooperates with the cam 30. A spring 63 attached to the arm 60 operates to hold the roller 62 in engagement with its cam. Thus, in operation, when the bottle is moved into operative position with relation to the registering apparatus at station 10, the cam 30 operates to raise the movable member 38 which engages the ends of the transverse member 34 to remove the pad 20 from engagement with the bottle and render ineffective the pressure of the flexible strip 22.

Simultaneously with the removal of the pad 20 from operative engagement with the bottle, provision is made for effecting lateral support for the upper or neck portion of the bottle at station 10. As illustrated in Figs. 1 and 2, a stationary roller 64 is arranged to bear against one side of the neck portion of the bottle. The stationary roller is carried in an angle piece 66 adjustably mounted in a stationary bracket 68. The other side of the neck portion is supported by two rollers 70, 72 rotatably mounted in an angle piece 74 which is similarly mounted for vertical adjustment in an angle bracket 76. The angle bracket 76 is attached to a carrier 78 slidingly mounted in a bracket 80 and is arranged to be reciprocated laterally to urge the rollers 70, 72 into yielding engagement with the neck portion of the bottle through connections from the pad raising mechanism, as illustrated in Fig. 1. These connections include a third arm 82 of the lever pivotally mounted at 48 which is connected by a link 84 to one arm 86 of a bell-crank rockingly mounted at 88, the second arm 90 being connected by a rod 92 to a lug 94 attached to the carrier 78. The lug 94 extends through a slot 96 provided in the bracket 80. The rod 92 is slidingly fitted in the lug 94 and a coil spring 98 on the rod 92 is arranged to urge the lug 94 against a nut 100 provided on the rod 92. In operation, when the cam 30 is operated to effect raising of the pad 20, as described, the carrier 78 is moved inwardly to present the rollers 70, 72 into engagement with the neck of the bottle, which, in cooperation with the stationary roller 64 form a three point bearing against the bottle neck to assure axial alignment of the bottle at right angles to the conveyer during the rotation thereof as will be described. The spring 98 permits yielding engagement of the rollers 70, 72 against the bottle, as clearly shown in Fig. 1.

Referring now to Figs. 1, 4 and 9, the bottle rotating and registering mechanism therein shown for rotating the bottle into a position approximating the desired position, comprises a driving unit 102 including a pair of driven rollers 104, 106, and an opposing unit 108 including an idler roll 110 and a detecting finger 111. The driving unit 102 is mounted upon a carrier 112 arranged to be reciprocated transversely of the container supporting belt 12, in a slide bracket 114 mounted on the platen 116 of the machine frame. The idler roll unit 108 is similarly mounted on a carrier 118 slidingly mounted in a bracket 120 attached to the platen 116.

Provision is made for simultaneously reciprocating the units 102, 108, toward and from each other to present the rollers 104, 106, and 110 into and out of operative engagement with the bottle 14 in timed relation to the intermittent movement of the belt 12. As herein shown, the reciprocation of each unit is effected through connections from a cam 122 mounted fast on the cam shaft 32 including a cam roller 124 carried by a cam lever 126 and cooperating with a cam path 128 formed in the closed cam 122. The cam lever 126 is rockingly mounted on the stud 56 and is connected to one arm 130 of a two-armed lever pivotally mounted on a stud 132 carried in a bracket 134 attached to the machine frame. In order to reciprocate the unit 108, a second arm 136 of the two-armed lever is connected by a link 138 to a depending lug 140 fixed in the carrier 118. The link 138 is slidingly extended through the lug 140 and a coil spring 142 on the link 138 permits the idler roller 110 to be yieldingly pressed into engagement with the bottle, as clearly illustrated in Fig. 1.

The driving unit 102 is arranged to be reciprocated by connections including a link 144 connecting the arm 130 to an arm 146 pivotally mounted on a stud 148 carried in a bracket 150 attached to the machine frame. The arm 146 is provided with a slotted portion 152 in which a slide block 154, carried in one arm 156 of a bell-crank 158 is arranged to be received. The bell-crank 158 is rockingly mounted in a bracket 160 attached to the platen 116, and the second arm 162 of the bell-crank is connected by a link 164 to a depending lug 165 attached to the carrier 112, as shown in Fig. 1.

Provision is made for driving the rollers 104, 106 through connections from the cam shaft 32, and as herein shown, a gear 170 fast on the cam shaft is arranged to mesh with a pinion 172 fast on a shaft 174 carried in a bracket 176, see Fig. 3. A bevel gear 177 also fast on the shaft 174 meshes with a bevel gear 178 fast on a vertical shaft 180 which is arranged to drive a spindle 182, through a universal joint connection 185 so as to permit the driving mechanism to operate during the reciprocal movement of the carrier 112.

Referring now particularly to Figs. 4 and 9, the upper end of the spindle 182 is provided with a clutch housing 190 fast thereon which forms part of a friction clutch having a plurality of disks 192 arranged to frictionally engage and drive an elongated hollow member 194 fitted over the spindle 182 and which is rotatably mounted in a roller bearing 196 carried in the carrier member 112. As best shown in Fig. 10, alternate disks 192 are arranged to grip the upper portion 198 of the member 194 and a coil spring 200 arranged to compress the disks 192 may be adjusted to effect more or less frictional pressure by rotating a nut 202 on a threaded portion 204 of the member 194. The lower end of the member 194 is provided with a gear 206 formed integrally therewith which meshes with pinions 208, 210 keyed to the lower ends of vertical shafts 212, 214 respectively upon which the rollers 104, 106 are mounted, as shown in Fig. 4. The elongated driven member 194 is supported vertically on the spindle 182 by a thrust bearing 216, and a collar 218 formed integrally with the shaft 182 is supported by a bracket 220 attached to the underside of the carrier 112. The vertical shafts 212, 214 are rotatably mounted in roller bearings 222, 224 held in suitable bearing brackets 226, 228, as best shown in Fig. 10. The rollers 104, 106 are preferably provided with rubber rings 230 for engagement with the bottle, and the rollers are arranged to be adjusted vertically on the shafts 212, 214. As shown in Fig. 10, each shaft is provided with an elongated key 232 to prevent rotation of the rolls on the shafts, and set screws 234 hold the rolls vertically on the shafts.

Referring now particularly to Figs. 4, 5, 6 and 9, provision is made for stopping and starting the frictionally driven rollers 104, 106, when the bottle has been rotated to a preliminary position approximating a predetermined final position with relation to the conveyer belt 12. As herein shown, the driven member 194 is provided with a ratchet 236 keyed thereon which is arranged to be engaged by one of a pair of pawls 238, 240, see Fig. 10, pivotally mounted in the carrier 112. One pawl 238 may be made slightly shorter than its companion pawl 240, by a distance of one half a tooth of the ratchet, in order to permit either pawl to fall into the nearest tooth of the ratchet thereby enabling the driven unit 194 to be stopped more quickly. Each pawl is provided with a spring 242 which normally urges the pawls into operative engagement with its rachet.

Provision is made for engaging and disengaging the pawls from the ratchet, to stop and start rotation of the driving unit and bottle rotating rollers through connections from the detecting finger 111 so as to permit rotation of the bottle to be terminated when the detecting finger is moved by the projection 16 on the bottle. The detecting finger 111 is mounted fast on a vertical shaft 244 rockingly mounted in suitable bearings 246, 248 attached to a bracket 250 mounted on the reciprocating carrier 118. The lower end of the vertical shaft 244 is provided with a lever 252 carrying a roller 254 arranged to engage one end 256 of a cam bar 257 pivotally mounted intermediate its ends on a stud 258 secured in a bracket 260 attached to the platen 116. The detecting finger 111 is free to rock in either direction between limits determined by adjustment of stop screws 262 carried in the lower bearing member 248, as shown in Figs. 5 and 9. The other end 264 of the pivotally mounted cam bar 257 is arranged to be engaged by a roller 266 carried by a lever 268 mounted fast on the lower end of a stud 270 rockingly mounted in a bracket 272 attached to the carrier 112. A spring 274 attached to the end 256 of the cam bar 257 normally urges the bar against the roller 254 to move the detecting finger into operative engagement with the bottle being rotated. The upper end of the stud 270 is provided with a latch member 276 arranged to engage the tail portions of the pawls 238, 240 to hold them out of engagement with the ratchet 236. A spring 278 attached to a stud 280 in the lever 268 is arranged to urge the latch member 276 into latching position, and also to cause the roller 266 to engage the cam bar end 264.

In the operation of the apparatus thus far described, when the opposing units 102, 108 are moved inwardly to cause the rollers 104, 106, and 110 to engage the bottle, the rollers 104, 106 are driven to rotate the bottle through the connections described. When the projection 16 on the bottle engages the detecting finger 111, the shaft 244 is rocked which rocks the cam bar 257 to move the latch out of the path of the tail portions of the pawls 238, 240 to permit them to engage the ratchet 236 to stop the driven member 194 and the rollers 104, 106. The friction clutch, including the housing 190 and the disks 192, is permitted to slip on the driven member 194 while the pawls 238, 240 are in engagement with the ratchet 236.

Provision is made for resetting the detecting mechanism and for removing the pawls 238, 240 from engagement with the ratchet upon the return movement of the driving unit 102, and as herein shown, the resetting mechanism includes a bell-crank 282 pivotally mounted on a stud 284 attached to the carrier 112. One arm of the bell-crank is provided with a resetting pin 290 arranged to engage the tail portions of the pawls 238, 240 to disengage the same from the ratchet and to permit the latch member 276 to fall into latching position, as shown in Figs. 4 and 6. The other arm of the bell-crank 282 is provided with a cam roll 292 arranged to cooperate with a stationary cam piece 294 mounted on the slide bracket 114. A spring 296 is arranged to hold the roll against its cam. Normally when the unit 102 is in its advanced or operative position against the bottle, the roll 292 is against the low portion of the cam piece 294 to hold the resetting pin 290 out of engagement with the tail portions of the pawls. When the unit is retracted, the roll 292 rides upon the high spot of the cam piece 294, as clearly illustrated in Fig. 6, to disengage the pawls 238, 240 from the ratchet 236 and to permit the latch 276 to be moved into locking position.

As illustrated in Fig. 5, the detecting finger 111 and associated control mechanism at station 10 is adapted to terminate rotation of the bottle 14 in a preliminary position approximating the desired position, and as herein shown, the bottle is preferably brought to rest at station 10 with the raised portion 16 disposed a short angular distance beyond a position at right angles to the path of the conveyer 12. In practice, the angular distance from a diametral line passing through the center of the bottle at right angles to the conveyer, to a diametral line drawn from the center of the bottle through the raised portion 16 may vary from 5 to 10 degrees when rotation of the bottle is terminated at station 10, as determined by initial adjustment of the control mechanism and by variations due to differences in height of successive bottles, overriding or other causes. It will also be observed that the accuracy of registration at station 10 is limited by the distance between the teeth in the ratchet 236, so that exact registration may not be effected at station 10.

After the bottle has been rotated to a preliminary position of alignment, as above described, the pad 20 of the endless chain 18 is again lowered into engagement with the top of the bottle, at station 10, to hold the bottle in its "roughly spotted" or preliminary aligned position during subsequent intermittent movement of the bottle into operative position to station 300 wherein provision is made for rotating the bottle in a reverse direction and at a relatively slower speed until the raised portion 16 assumes the desired position at right angles to the conveyer belt to effect accurate registration of the bottles.

As soon as the bottle comes to rest at station 300 in its preliminary aligned position, the pad 20 is again raised from engagement with the top of the bottle to permit rotation thereof into accurate alignment, and as illustrated in Fig. 14 this may be accomplished by mechanism similar to that shown in Fig. 1. As shown in Fig. 14, such mechanism includes a cam operated linkage comprising a two-armed lever pivotally mounted at 48 having one arm 302 engageable with the underside of the washer 44 and a second arm 304 connected by a link 306 to one arm 308 of a cam lever pivotally mounted on the shaft 56. The second arm 310 of the cam lever is provided with a roller 312 which cooperates with a cam 314 fast on the cam shaft 32. A spring 316 attached to the arm 310 operates to hold the roller 312 in engagement with its cam.

As illustrated in Figs. 4 and 14, the second station 300 of the registering mechanism comprises a pair of spaced idler rolls 318, 320 mounted upon a carrier 322 arranged to be reciprocated transversely of the conveyer belt 12 in a slide bracket 324 attached to the platen 116 of the machine frame. The idler rolls 318, 320 are arranged to engage and support one side of the bottle to permit rotation thereof during the final registering operation. The final registering operation is performed by a cam operated registering finger 326 disposed on the opposite side of the conveyer and arranged to engage the raised portion 16 in its preliminary aligned angular position and to move it into a position at right angles to the conveyer 12, as shown in Fig. 4.

The carrier 322 and idler roll unit 318, 320 is arranged to be reciprocated into and out of operative engagement with the bottle in timed relation to the intermittent movement of the belt 12 through connections from a cam 328 mounted fast on the cam shaft 32 in a manner similar to the connections for operating the carrier 112 as shown in Fig. 1, and as shown in Fig. 14, a cam roller 330 carried by a cam lever 332 rockingly mounted on the shaft 56 is arranged to cooperate with a cam path 334 formed in the cam 328. The cam lever 332 is connected by a link 335 to one arm 336 of a two-armed lever pivotally mounted at 132. A link 338 connects the arm 336 to an arm 340 pivotally mounted on the shaft 148, the arm 340 being provided with a slot 342 in which a slide block 344 carried in one arm of a bell-crank 346 is arranged to be received. The second arm of the bell-crank 346 is connected by a link 348 to a depending lug 349 attached to the carrier 322, as shown in Fig. 14.

The cam operated final registering finger 326 forms one arm of a bell-crank pivotally mounted at 350 which comprises part of a linkage arranged to rock the registering finger 326 from a neutral or retracted position, indicated by dotted lines at 326' in Fig. 4, to an extended position in engagement with the periphery of the bottle, as indicated in dotted lines at 326'', and to then cause the finger to move along the periphery of the bottle to engage the raised portion and to effect rotation of the bottle in a clockwise direction until the raised portion assumes a position at right angles to the conveyer, as shown in full lines in Fig. 4.

The linkage for effecting such movement of the registering finger 326, as illustrated in Figs. 4 and 7, includes an arm 352 which carries the pivot 350 on which the registering finger bell-crank is mounted, the arm 352 being rockingly mounted and frictionally held on a stud 354 fast in a stationary bracket 356 attached to the machine frame. The arm 352 is frictionally retained in any position to which it is moved, by a friction washer 358 urged into engagement with the upper surface of its hub by a coil spring 360 interposed between the friction washer and the underside of the head of the stud 354, as clearly shown in Fig. 7. A stop pin 353 carried by the arm 352 is arranged to limit the rocking movement of the registering finger bell-crank by engagement with the second arm 362 of the latter. As herein shown, the second arm 362 of the registering finger bell-crank is connected by a link 364 to one arm 366 of a bell-crank pivotally mounted at 368 in the stationary bracket 356. The second arm 370 of the bell-crank is connected by a link 372 to the arm 374 of the two-armed lever pivotally mounted at 132, as shown in Fig. 14, thus effecting simultaneous operation of the registering finger 326 and the reciprocatory member 322 carrying the rollers 318, 320.

In the operation of the above described linkage it will be observed that when the cam 328 is operated to effect retraction of the finger 326 from its full line position to its neutral position, illustrated in Fig. 4, after the bottle has been rotated to its predetermined aligned position, the bell-crank 370, 366 is first rocked in a clockwise direction on its pivot 368 and the registering finger bell-crank is rocked in a counter-clockwise direction on its pivot 350 until the arm 362 engages the stop pin 353 carried by the arm 352. Thereafter, rocking movement of the frictionally held arm 352 is effected in a counter-clockwise direction on its stud 354 until it reaches its dotted line position shown in Fig. 4, with the finger 326 disposed in a retracted position substantially parallel to the conveyer 12. In its retracted position, the finger 326 is disposed out of the path of the bottle 14 and its raised portion 16 to avoid interference with the raised portion during movement of the bottle into and out of registering position at station 300.

During the following cycle of operation when the cam 328 operates to effect extension of the linkage into engagement with a succeeding bottle to be aligned, the registering finger 326 is first rocked in a clockwise direction on its pivot 350 away from the stop pin 353 until the point of the finger engages the bottle whereupon the finger will bear against and slide along the periphery of the bottle and effect rocking movement of the frictionally held arm 352 from its dotted to its full line position, as shown in Fig. 4. During such movement, the finger 326 will engage the raised portion 16 in its preliminary aligned position and move it to a position at right angles to the conveyer, as illustrated. In the embodiment of the invention illustrated in Fig. 4, the throw of the cam 328 and the associated linkage may be adjusted to bring the linkage to rest when the predetermined point of alignment is reached.

In practice, the movement of the registering finger 326 to move the bottle in a clockwise direction is relatively slow as compared to the counter-clockwise rotary movement of the bottle at station 10, so that overriding of the bottle beyond the registered position when the finger comes to rest is reduced to a minimum. However, in some instances, the finger 326 may engage an imperfection in the periphery of the bottle in advance of the raised portion 16 so that inaccurate registration may occur when imperfect bottles are encountered. In accordance with the embodiment of the invention shown in Fig. 8, provision is made for positively assuring accurate registration, and as therein shown, a pivotally mounted and yieldingly engageable stop finger 376 may be provided arranged to cooperate with the finger 326 and to engage the opposite side of the raised portion 16 when the bottle is rotated in a clockwise direction. The stop finger 376 is attached to an arm 378 pivotally mounted on a stud 380 and is urged in a counter-clockwise direction or inwardly into engagement with the bottle by a spring 382, the movement in this direction being limited by a pin 384 engageable with the arm 378. In the event that the raised portion extends into the path of the end of the stop finger as the bottle is conveyed into operative position at station 300, the finger 376 will be rocked out of the way to permit the bottle to pass and the finger will then snap back into engagement with the periphery of the bottle on the left hand side of the raised portion, 16. It will be observed that the bottle is held in its prealigned position during movement thereof by the pressure pads 20 of the upper chain 18 in cooperation with the conveyer belt 12, as described. Thus, if the registering finger 326 should engage a relatively small protusion of a defective bottle, during the final registering operation, the bottle will be rotated in a clockwise direction until the raised portion 16 strikes the stop finger 376 and then the registering finger 326 will ride over the imperfection and come into engagement with the opposite side of the raised portion 16 so that the latter will be engaged between the two fingers thus effecting accurate and uniform registration of successive bottles relative to the conveyer for the application of labels upon predetermined portions of the bottles at succeeding stations of operation.

Throughout the foregoing specification, and in the claims, it will be understood that wherever the term "bottle" is used, it is intended to include any type of container adapted to be rotated into a predetermined position with respect to its conveying element. It will also be understood that wherever the word "lettering" is used, it is intended to include any other projections, designs or characters formed upon the surface of the container adapted to be engaged by a detecting finger and to actuate control mechanism for positioning a container in a predetermined position with relation to its conveying element.

While the preferred embodiment of the invention has been herein illustrated and described, it will be understood that the invention may be embodied in other forms within the scope of the following claims.

Having thus described the invention, what is claimed is:

1. Container handling and registering apparatus having, in combination, means for conveying successive containers having lettering formed on the surface thereof, and container registering mechanism for registering the container with the lettering disposed in a predetermined position with respect to the conveying means, comprising means for first rotating the container into a preliminary position of registration approximating said predetermined position, and means movable along the surface of the container for thereafter engaging the lettering on the container in its preliminary position and rotating the container into said predetermined position of registration.

2. Container handling and registering apparatus having, in combination, means for conveying successive containers having lettering formed on the surface thereof, and container registering mechanism for registering the container with the lettering disposed in a predetermined position with respect to the conveying means, comprising means disposed at one station of operation for rotating the container to a preliminary position of registration approximating said predetermined position, and means movable along the surface of the container disposed at a second station of operation for engaging the lettering on the container in its preliminary position and rotating the container to said predetermined position of registration.

3. Container handling and registering apparatus having, in combination, means for conveying successive containers having lettering formed on the surface thereof, and container registering mechanism for registering the container with the lettering disposed in a predetermined position with respect to the conveying means, comprising means for first rotating the container in one direction to dispose the container in a preliminary position of registration with the lettering disposed a short distance beyond the predetermined position, and means movable along the surface of the container for thereafter engaging the lettering on the container in its preliminary position and rotating the container in the opposite direction into said predetermined position of registration.

4. Container handling and registering apparatus having, in combination, means for conveying successive containers having lettering formed on the surace thereof, and container registering mechanism for registering the container with the lettering disposed in a predetermined position with respect to the conveying means, comprising means for first rotating the container in one direction and at a relatively high speed to dispose the container in a preliminary position of registration with the lettering disposed a short distance beyond the predetermined position, and means movable along the surface of the container for thereafter engaging the lettering on the container in its preliminary position and rotating the container in the opposite direction and at a relatively slower speed into said predetermined position of registration.

5. Container handling and registering apparatus having, in combination, means for conveying successive containers having lettering formed on the surface thereof, and container registering mechanism for registering the container with the lettering disposed in a predetermined position with respect to the conveying means, comprising means disposed at one station of operation for rotating the container into a preliminary position of registration such that a diametral line passing through the container and through the lettering extends at an angle with respect to a similar diametral line at right angles to the conveyer, and means disposed at a second station of operation and movable along the periphery of the container for engaging the lettering on the container in its preliminary position and rotating the container to dispose said diametral line passing through said lettering into a position of coincidence with the diametral line at right angles to the conveyer.

6. Container handling and registering apparatus having, in combination, means for conveying successive containers having lettering formed on the surface thereof, and container registering mechanism for registering the container with the lettering disposed in a predetermined position with respect to the conveying means, comprising means for first rotating the container into a preliminary position of registration approximating said predetermined position, and means movable along the surface of the container for thereafter engaging the lettering on the container in its preliminary position and rotating the container into said predetermined position of registration, and stop means cooperating with said letter engaging and container rotating means for assuring accurate positioning of the container in said predetermined position.

7. Container handling and registering apparatus having, in combination, means for conveying successive containers having lettering formed on the surface thereof, and container registering mechanism for registering the container with the lettering disposed in a predetermined position with respect to the conveying means, comprising means for first rotating the container in one direction to dispose the container in a preliminary position of registration with the lettering disposed a short distance beyond the predetermined position, and means movable along the surface of the container for thereafter engaging the lettering on the container in its preliminary position and rotating the container in the opposite direction into said predetermined position of registration, and stop means cooperating with said letter engaging and container rotating means and engageable with the opposite side of said lettering for assuring accurate and uniform positioning of successive containers in said predetermined position.

8. Container handling and registering apparatus having, in combination, means for conveying successive containers having lettering formed on the surface thereof, and container registering mechanism for registering the container with the lettering disposed in a predetermined position with respect to the conveying means, comprising means disposed at one station of operation for rotating the container in one direction to dispose the container in a preliminary position with a diametral line passing through the lettering extended at a relatively small and variable angle with respect to a diametral line at right angles to the conveyer, and a registering finger disposed at a second station of operation for engaging the periphery of the container, means for moving the registering finger along the periphery and into engagement with one side of the lettering to effect rotation of the container in an opposite direction until said diametral lines coincide, and a stationary stop finger cooperating with said registration finger and engageable with the opposite side of said lettering for assuring accurate and uniform positioning of successive containers in said predetermined position.

9. Container handling and registering apparatus having, in combination, means for conveying successive containers having lettering formed on the surface thereof, and container registering mechanism for registering the container with the lettering disposed in a predetermined position with respect to the conveying means, comprising means disposed at one station of operation for rotating the container in one direction to dispose the container in a preliminary position with a diametral line passing through the lettering extended at a relatively small and variable angle with respect to a diametral line at right angles to the conveyer, and a registering finger disposed at a second station of operation for engaging the periphery of the container, means for moving the registering finger along the periphery and into engagement with one side of the lettering to effect rotation of the container in an opposite direction until said diametral lines coincide, and a stationary stop finger cooperating with said registration finger and engageable with the opposite side of said lettering for assuring accurate and uniform positioning of successive containers in said predetermined position, and a pair of idler rolls engageable with and arranged to support the container for rotation at said second station.

10. Container handling and registering apparatus having, in combination, means for conveying successive containers having lettering formed on the surface thereof, and container registering mechanism for registering the container with the lettering disposed in a predetermined position with respect to the conveying means, comprising means disposed at one station of operation for rotating the container to a preliminary position of registration approximating said predetermined position, and means disposed at a second station of operation and movable along the periphery of the container for engaging the lettering on the container in its preliminary position and rotating the container to said predetermined position of registration, and a pair of idler rolls engageable with and arranged to support the container for rotation at said second station.

11. Container handling and registering apparatus having, in combination, means for conveying successive containers having lettering formed on the surface thereof, and container registering mechanism for registering the container with the lettering disposed in predetermined position with respect to the conveying means, comprising detecting means for detecting the lettering, means for rotating the container, and connections between the detecting means and said container rotating means for terminating rotation of the container in a preliminary position approximating said predetermined position when the lettering is detected, and means movable along the surface of the container for thereafter engaging the lettering on the container in its prealigned position and rotating the container into said predetermined position of registration.

12. Container handling and registering apparatus having, in combination, means for conveying successive containers having lettering formed on the surface thereof, and container registering mechanism for registering the container with the lettering disposed in predetermined position with respect to the conveying means, comprising detecting means for detecting the lettering, means for rotating the container, and connections between the detecting means and said container rotating means for terminating rotation of the container in a preliminary position approximating said predetermined position when the lettering is detected, and a registering finger disposed at a second station of operation and movable along the periphery of the container for thereafter engaging the lettering and rotating the container into a final position of registration.

13. Container handling and registering apparatus having, in combination, means for conveying successive containers having lettering formed on the surface thereof, and container registering mechanism for registering the container with the lettering disposed in predetermined position with respect to the conveying means, comprising detecting means for detecting the lettering, means for rotating the container, and connections between the detecting means and said container rotating means for terminating rotation of the container in a preliminary position approximating said predetermined position when the lettering is detected, and a registering finger disposed at a second station of operation for thereafter engaging the lettering and rotating the container into a final position of registration, and stop means cooperating with said registering finger for assuring accurate and uniform registration of successive containers in said predetermined position.

14. In a machine of the character described, in combination, a conveyer for conveying successive containers having lettering formed on the surface thereof and with the container disposed in a preliminary position of registration approximating a predetermined position with respect to the conveyer, and means movable along the surface of the container for engaging the lettering on the container in its preliminary position and rotating the container into said predetermined position with respect to said conveyer.

15. In a machine of the character described, in combination, a conveyer for conveying successive containers having lettering formed on the surface thereof and with the container disposed in a preliminary position of registration approximating a predetermined position with respect to the conveyer, and means movable along the surface of the container for engaging the lettering on the container in its preliminary position and rotating the container into said predetermined position with respect to said conveyer, and stop means cooperating with said letter engaging and container rotating means for assuring accurate and uniform positioning of successive containers in said predetermined position.

16. In a machine of the character described, in combination, a conveyer for conveying successive containers having lettering formed on the surface thereof and with the container disposed in a preliminary position of registration approximating a predetermined position with respect to the conveyer, a registering finger engageable with the peripheral surface of the container in its preliminary position, and means for moving the finger along the peripheral surface and into engagement with one side of the lettering to effect rotation of the container into said predetermined position with respect to the conveyer.

17. In a machine of the character described, in combination, a conveyer for conveying successive containers having lettering formed on the surface thereof and with the container disposed in a preliminary position of registration approximating a predetermined position with respect to the conveyer, a registering finger engageable with the surface of the container in its preliminary position, and means for moving the finger along the surface and into engagement with one side of the lettering to effect rotation of the container into said predetermined position with respect to the conveyer, and a stationary stop finger cooperating with said registering finger and engageable with the opposite side of said lettering whereby to assure accurate and uniform positioning of successive containers in said predetermined position.

18. In a machine of the character described, in combination, a conveyer for conveying successive containers having lettering formed on the surface thereof and with the container disposed in a preliminary position of registration approximating a predetermined position with respect to the conveyer, a registering finger engageable with the surface of the container in its preliminary position, and means for moving the finger along the surface and into engagement with one side of the lettering to effect rotation of the container into said predetermined position with respect to the conveyer, and a stationary stop finger cooperating with said registering finger and engageable with the opposite side of said lettering whereby to assure accurate and uniform positioning of successive containers in said predetermined position, and a plurality of idler rolls engageable with and arranged to support the container for rotation during the registering operation.

19. Container handling and registering apparatus having, in combination, an intermittently operated conveyer for conveying successive containers having lettering formed on the surface thereof, and container registering mechanism for registering the containers with the lettering disposed in a predetermined position with respect to the conveyer, comprising means disposed at one station of operation for rotating the container to a preliminary position of registration approximating said predetermined position, means engageable with the top of the container for clamping and holding the container in its preliminary position during intermittent movement to a second station, a registering finger engageable with the surface of the container at said second station, means for moving the finger along the surface and into engagement with one side of the lettering to effect rotation into said predetermined position, a pivotally and yieldingly mounted stop finger cooperating with said registering finger and engageable with the opposite side of said lettering to assure accurate and uniform positioning of successive containers in said predetermined position, and a reciprocal member having a pair of idler rolls arranged to support the container for rotation when moved into operative position therewith during the registering operation.

20. Container handling and registering apparatus having, in combination, an intermittently operated conveyer for conveying successive containers having lettering formed on the surface thereof, and container registering mechanism for registering the containers with the lettering disposed in a predetermined position with respect to the conveyer, comprising means disposed at one station of operation for rotating the container to a preliminary position of registration approximating said predetermined position, means engageable with the top of the container for clamping and holding the container in its preliminary position during intermittent movement to a second station, a registering finger engageable with the surface of the container at said second station, means for moving the finger along the surface and into engagement with one side of the lettering to effect rotation into said predetermined position, a pivotally and yieldingly mounted stop finger cooperating with said registering finger and engageable with the opposite side of said lettering to assure accurate and uniform positioning of successive containers in said predetermined position, and a reciprocal member having a pair of idler rolls arranged to support the container for rotation when moved into operative position therewith during the registering operation, and means for simultaneously operating said registering finger and reciprocating said idler rolls into operative engagement with the container in timed relation to the intermittent movement of said conveyer.

JOSEPH MAGNUSSON.

REFERENCES CITED

The following references are of record in the file of this patent:

UNITED STATES PATENTS

| Number    | Name      | Date           |
|-----------|-----------|----------------|
| 1,608,119 | Perchard  | Nov. 23, 1926  |
| 2,293,553 | Magnusson | Aug. 18, 1942  |
| 2,426,433 | Carter    | Aug. 26, 1947  |